INVENTOR.
BY ROBERT H. PREW
*Kenway, Jenney & Hildreth*
ATTORNEYS

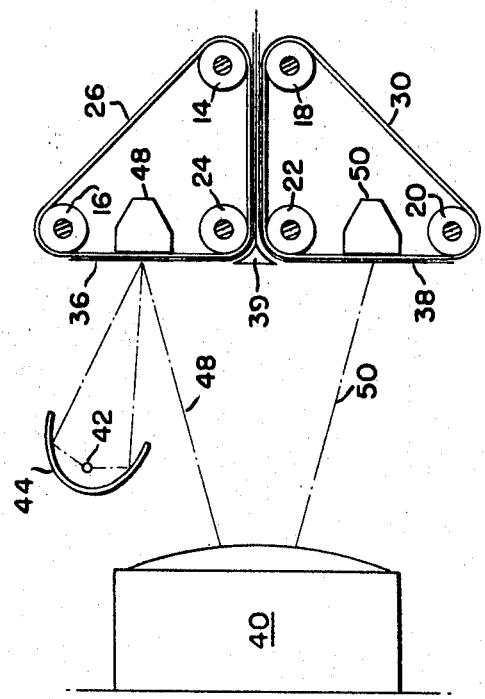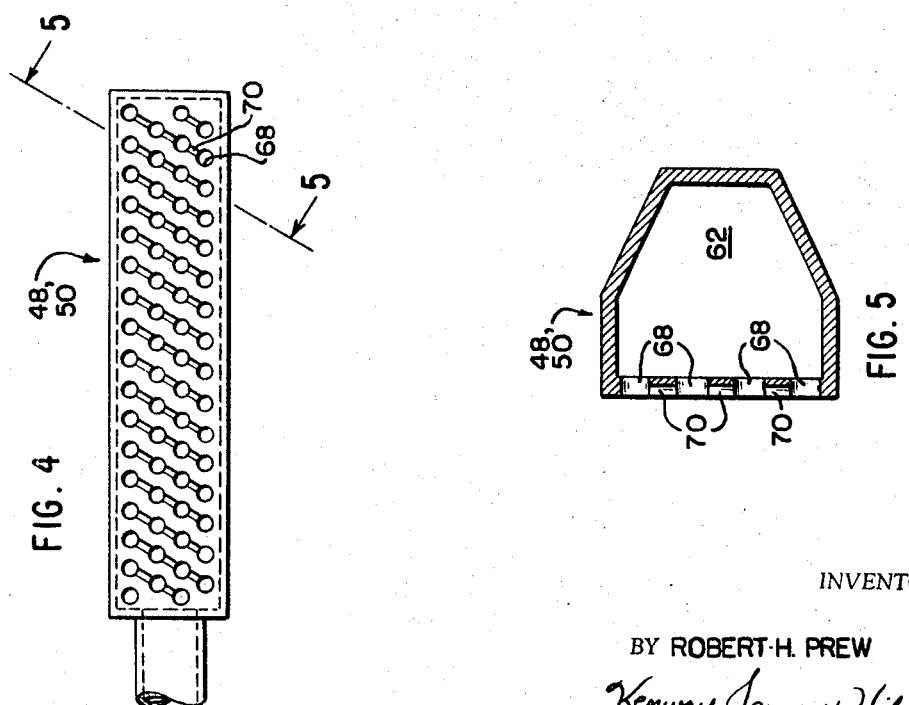

United States Patent Office 3,451,754
Patented June 24, 1969

3,451,754
SYNCHRONOUS PAPER FEEDING MECHANISM
Robert H. Prew, Amherst, N.H., assignor to Nashua Corporation, Nashua, N.H., a corporation of Delaware
Filed Dec. 19, 1966, Ser. No. 603,039
Int. Cl. G03b 27/60
U.S. Cl. 355—73                              1 Claim

ABSTRACT OF THE DISCLOSURE

This invention features a synchronous paper feeding mechanism for use with a high aperture reflection copying system having a narrow depth of field. The mechanism includes a pair of perforated conveyor belts which carry the sensitized image-receiving copy sheet and master sheet past a reflection lens system, and a pair of vacuum boxes positioned behind the respective belts for securing the sheets to the belts opposite the lens system and holding the sheets within the depth of field of the lens.

---

One form of high-aperture reflection copying system is described in United States application Ser. No. 478,846 filed August 1965 by John H. Jeffree now Patent No. 3,364,816. The copying system described in that application utilizes a light source and a high-aperture lens having a very shallow depth of field for scanning the object element and reproducing an image on the image-receiving element. To effectuate the desired scanning, the light source and the lens system are held stationary in one embodiment of the above-described invention while the object or master sheet and the image-receiving or copy sheet are moved with respect to the lens.

With this configuration, it is necessary to insure that the object and the image-sheets are accurately positioned within the depth of field of the lens system which, in practice, may be as narrow as .002 inch. It is also necessary to insure that these sheets move past the lens system at the same relative speed in order to prevent a lengthening or contraction of the reproduced image in the direction of motion.

According to this invention, the object and image sheets are moved past the lens system while being accurately positioned in the depth or field of the lens by means of a pair of perforated conveyor belts and a pair of vacuum boxes positioned adjacent the conveyor belts in the vicinity of the lens system but on the side of the belt opposite to that of the respective sheets; these vacuum boxes are coextensive in width with the respective conveyor belts. As the object and image sheets are moved by these belts into registration with the field of the lens, the vacuum boxes, acting through the perforations in the conveyor belts, create a vacuum on the rear surfaces of the respective elements which positions the elements securely against the belts and thus maintains them within the critical limits of the depth of the field of the lens.

A convenient and inexpensive means of maintaining a synchronous motion of the object and image sheets with respect to the lens system utilizes a continuous band having a toothed or serrated surface on one side for interconnecting a driving gear which is actuated by external driving means and which supplies driving power to the band and a driven gear which is driven by the band in a direction of rotation opposite to that of the driving gear; the driving gear and driven gear in turn are connected directly to the respective conveyor belts for the object sheet and the image-receiving sheet respectively. In order to rotate the driving gear and the driven gear in opposite directions, the band is twisted 180° after passing over the driving gear and before passing over the driven gear and is again twisted 180° in an opposite direction and restored to its initial position after passing over the driven gear.

Accordingly, it is an object of my invention to provide an improved paper feeding mechanism for use with a high aperture reflection copying system having a narrow depth of field. Further, it is an object of my invention to provide an improved paper feeding mechanism which will maintain the object and image sheets within the depth of field of a high aperture reflection copying system.

The invention makes use of a pair of perforated belts for carrying the object and image sheets past a lens system and the provision of a vacuum box adjacent the belt for maintaining the respective elements securely on the belt in the vicinity of the lens system.

The above and other and further objects and features of my invention will become more readily apparent when taken in conjunction with the following detailed description of the drawings in which:

FIG. 3 is a side elevational view taken along the lines 3—3 of FIG. 1 and showing the positioning of the vacuum boxes with respect to the perforated belt;

FIG. 4 is a left elevational view of one of the vacuum boxes of FIG. 3; and

FIG. 5 is a sectional view along the lines 5—5 of FIG. 4 showing the construction of the vacuum boxes of FIG. 4 in greater detail.

Figure 1:
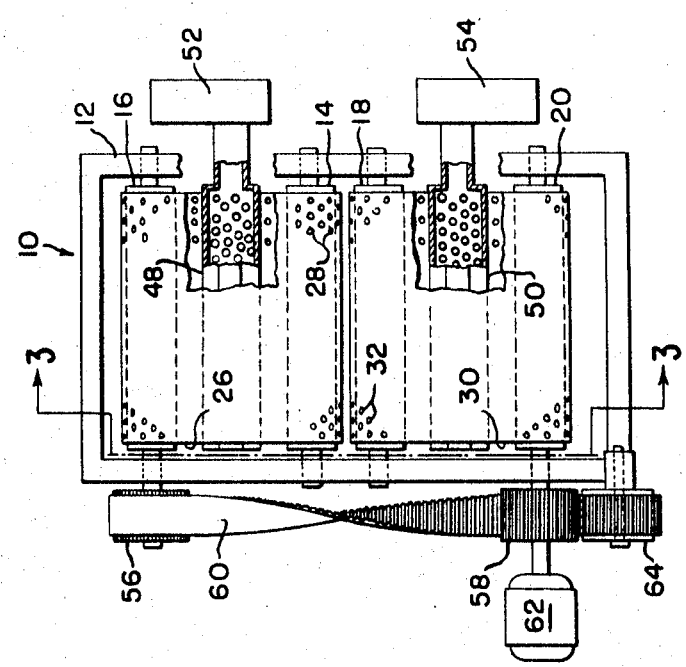
FIG. 1 is a front elevational view of a preferred form of paper feeding mechanism constructed in accordance with my invention.

Referring now to FIGS. 1 and 3 of the drawings, there is shown a paper feeding mechanism 10 having a frame 12 and a plurality of rollers 14 through 24 mounted on axles which are rotatably journalled into the sides of the frame 12. A continuous belt 26 having a plurality of perforations 28 through its surface is mounted over the rollers 14, 16, 24, and a continuous belt 30 having a plurality of perforations 32 is mounted over the rollers 18, 20, 22. As may be seen more clearly from FIG. 3, the conveyor belts 26 and 30, when mounted on the rollers, form triangles, one leg of each triangle being in a common plane, a second leg of each triangle forming one wall of a channel for feeding an object element 36 and an image element 38 toward the lens 40. To this end, the roller 16 is driven in a clockwise direction as viewed in FIG. 3 while the roller 20 is driven in a counterclockwise direction. A guide 39 is positioned at one end of the channel to separate the object and image elements and to feed them outwardly along the direction of motion of the respective belts.

Directly below the common plane is a lens system 40 having a concave reflecting mirror along its bottom portion and one or more correcting lenses positioned in front of the mirror; the lens system 40 is a high aperture system and accordingly has a very narrow depth of field. A light source 42, which may be an extended source such as a high-intensity tubular mercury arc lamp, is also disposed adjacent the vertical leg of the master sheet side and is surrounded by a reflector 44 for collecting the light emitted rearwardly by the lamp 42 and for focusing this light on a strip segment of the object element when it is moved past the lens system and light source. The construction of the lens system and light source is explained in greater detail in the application of John H. Jeffree described above. For purposes of the present application, it is sufficient to note that light rays from the source 42 travel along the paths 46 to the object sheet, are reflected by this element along the path 48 to the lens system 40, and are then reflected by the lens system along the path 50 to the image-receiving sheet where the reproduced image is formed on the sensitized image-receiving element.

As noted previously, the lens system 40 has a very narrow depth of field. Accordingly, it is essential that the object element and the image element be positioned a precise distance from the lens system in order that a sharp image may be formed. Accordingly, to ensure the proper location of the elements with respect to the lens when they are in the image-reproducing position, a pair of vacuum boxes 48 and 50 are positioned adjacent to the vertical legs of the triangles formed by the belts 26 and 30 respectively; as may be seen from FIG. 1, these vacuum boxes are coextensive with the belts 26 and 30 respectively and are connected to a pair of blowers 52 and 54 which provide a vacuum in the boxes 48 and 50 when the blowers are actuated. The vacuum created at the surface of these vacuum boxes is transmitted through the perforations in the belts 26 and 30 to the rear surface of the sheets 36 and 38 when these sheets are carried into image-reproducing position adjacent the vacuum boxes. The vacuum so applied secures the object and image sheets to the respective belts and ensures that these sheets are properly positioned in the depth of field of the lens 40 while the image is being formed on the image-receiving sheet 38.

The axles carrying the rollers 16 and 20 extend through the frame 12 to a pair of gears 56 and 58 which have a toothed outer surface. An endless substantially inelastic band 60 (e.g. a timing belt) having a toothed or serrated surface on one side is fitted over these gears and meshes with the teeth on the gears. Attached to the gear 58 is a motor 62 which rotates this gear to impart motion to the band 60. The motor 62 may be a conventional low horsepower electric motor although other sources of driving power may be utilized if desired. The gear 58 serves as a driving gear for the band 60, while the gear 56 is in turn driven by the band 60.

Figure 2:
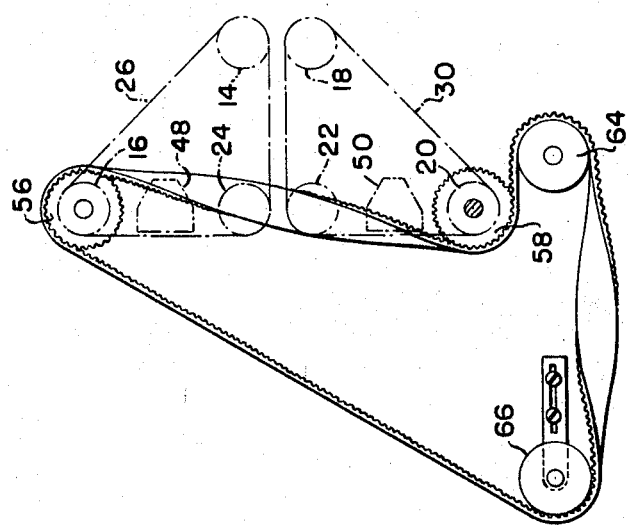
FIG. 2 is a side elevational view of the synchronous driving mechanism.

As may be seen more clearly from FIG. 2, the band 60 is looped around the gear 56 with the teeth of the band on the inside surface to impart a driving motion to the gear. After passing over this gear, the band is twisted 180° such that its toothed surface lies on the outer portion of the band and is passed under the gear 54 by which it is driven, this gear lying on the outside of the loop formed by the band. The band 60 is then passed over an idler gear 64 and thence to a tension gear 66 which may be attached to the frame 12 in a slidable fashion to adjust the tension on the band 60. After passing over the gear 64 and before running onto the gear 66, the band 60 is twisted in a direction opposite to its initial twist direction so that the toothed or serrated surface again lies on the inside of the loop formed by the band. Since the gears 56 and 58 lie on opposite sides of the loop, they rotate in opposite directions when the motor 62 is energized. Further, since they are directly interconnected by the band 60, these gears rotate synchronously and this synchronous motion is imparted to the rollers 16 and 20 and thence to the conveyor belts 26 and 30. Thus the object sheet 36 and the image sheet 38 will be moved synchronously at all times by these conveyor belts. This ensures that the reproduced image is not lengthened or shortened in the direction of motion of the conveyor belts by any disparity that might otherwise exist in the relative motion of the sheets with respect to the lens system.

It will be noted that the usual arrangement for rotating a pair of rollers in opposite directions is to utilize a "crossed-band" system in which the band is crossed over from the top portion of one roller to the bottom portion of the other. This system is generally inappropriate, however, for driving arrangements using a toothed or serrated belt since the toothed surfaces are likely to catch each other and abrade each other at the mid-point of the crossover where the surfaces are most likely to come into contact. The driving arrangement described above avoids these difficulties.

FIG. 4 is a bottom planar view of one of the vacuum boxes 48, 50 and FIG. 5 is a sectional view along the lines 5—5 of FIG. 4. As shown in these drawings, the walls of the vacuum boxes adjacent the object and image sheets have a plurality of perforations 68 extending therethrough, these perforations being connected along diagonal lines by shallow grooves 70 which extend slightly into the surface of the vacuum box, but do not extend into the interior 72 of the box as do the perforations 68. A vacuum is created in the grooves 70 through the perforations 68. Thus, the vacuum boxes 48, 50 have a vacuum over substantially one entire surface when the blowers 52 and 54 are actuated. Since the grooves 70 extend in a direction diagonal to the direction of travel of the conveyor belts and of the objects and image sheets, the vacuum boxes may be positioned directly against the conveyor belts to obtain a good vacuum without danger of the belts being caught in the grooves 70 during operation.

From the above it will be seen that I have provided a novel apparatus for accurately positioning an image-receiving element within the depth of field of a high-aperture reflection copying system having a narrow depth of field. The apparatus is simple to construct and maintain, and accomplishes the objects of this invention in an economical fashion.

Having described and shown a preferred embodiment of my invention, I claim:

1. In a copying system having a high aperture reflective lens system with a shallow depth or field for copying an object sheet onto a sensitized image receiving sheet, the improvement consisting of means for accurately positioning said sheets in the field of said lens system comprising first and second continuous conveyor belts having a plurality of perforations therethrough, means for moving said belts with respect to said lens system in a common plane in the field of said lens system, and vacuum means positioned adjacent each said belt at said common plane and on the opposite side of each said belt from said sheets whereby a vacuum is applied through said belts to said sheets to accurately position said elements in the field of said lens system, said vacuum means comprising vacuum boxes each having a wall parallel to the plane of said belts in the field of said lens system and substantially coextensive with the width of said belts, each said wall having a plurality of perforations therethrough, and means for generating a vaccum in said boxes whereby said vacuum is applied through the perforations in said walls and said belts to said sheets, said perforations being connected in the planes of said walls and in a direction diagonal to the direction of motion of said sheets by means of a plurality of shallow channels extending between said perforations and having a vacuum formed therein through said perforations, whereby a vacuum is formed over a substantial portion of each said wall.

References Cited

UNITED STATES PATENTS 2,868,070    1/1959    O'Brien.
3,181,420    5/1965    Rautbord _____ 95—1.7
3,282,177    11/1966    Stanton _____ 95—1.7

JOHN M. HORAN, *Primary Examiner.*

U.S. Cl. X.R.

355—51, 76